(12) United States Patent
Weber

(10) Patent No.: US 8,606,405 B2
(45) Date of Patent: Dec. 10, 2013

(54) APPARATUS FOR THE OPERATION OF A ROBOT

(75) Inventor: Guenther Weber, Gross Nemerow (DE)

(73) Assignee: Weber Maschinenbau GmbH, Breidenbach (DE)

( * ) Notice: Subject to any disclaimer, the term of this patent is extended or adjusted under 35 U.S.C. 154(b) by 542 days.

(21) Appl. No.: 12/717,546

(22) Filed: Mar. 4, 2010

(65) Prior Publication Data
US 2010/0228397 A1 Sep. 9, 2010

(30) Foreign Application Priority Data

Mar. 9, 2009 (DE) .................. 10 2009 012 328

(51) Int. Cl.
*G06F 3/041* (2006.01)
*G05B 15/00* (2006.01)
*G05B 19/00* (2006.01)
*H04B 3/36* (2006.01)

(52) U.S. Cl.
USPC ........... 700/264; 901/31; 345/173; 340/407.1

(58) Field of Classification Search
USPC ............. 345/173, 619; 715/771; 700/83, 169, 700/180–194, 245, 251, 257, 262, 264, 90; 901/1–36, 50; 318/568.1–568.25; 340/407.1–407.2
See application file for complete search history.

(56) References Cited

U.S. PATENT DOCUMENTS

| | | | | |
|---|---|---|---|---|
| 4,836,742 A | * | 6/1989 | Ishiguro et al. | 414/742 |
| 4,837,734 A | * | 6/1989 | Ichikawa et al. | 700/249 |
| 5,380,978 A | * | 1/1995 | Pryor | 219/121.64 |
| 5,499,320 A | * | 3/1996 | Backes et al. | 700/260 |
| 6,088,628 A | | 7/2000 | Watanabe et al. | |
| 6,535,787 B1 | | 3/2003 | Inamasu et al. | |
| 2003/0120391 A1 | | 6/2003 | Saito | |
| 2004/0243282 A1 | * | 12/2004 | Watanabe et al. | 700/259 |

FOREIGN PATENT DOCUMENTS

| | | |
|---|---|---|
| EP | 1 842 631 A1 | 10/2007 |
| JP | 11-262883 A | 9/1999 |
| JP | 2000-305614 A | 11/2000 |
| JP | 2006-350602 A | 12/2006 |

* cited by examiner

*Primary Examiner* — Khoi Tran
*Assistant Examiner* — Abby Lin
(74) *Attorney, Agent, or Firm* — Kilpatrick Townsend & Stockton LLP

(57) ABSTRACT

The invention relates to an apparatus for the operation of a robot having a product gripper which is designed to represent at least one approach position of the product gripper for the picking up and/or placing down of a product, in particular of a food product, as a graphical element on a display device. The apparatus is designed so that the respective graphical element can be directly displaced on the display device for the setting of the coordinates of the respective approach position, with the coordinates of the respective approach position being changed automatically in response to such a displacement of the graphical element in accordance with the displacement.

12 Claims, 2 Drawing Sheets

APPARATUS FOR THE OPERATION OF A ROBOT

CROSS-REFERENCES TO RELATED APPLICATIONS

This application claims priority to German Application No. 10 2009 012 328.8, filed Mar. 9, 2009, the disclosure of which is incorporated herein by reference.

BACKGROUND OF THE INVENTION

The present invention relates to an apparatus for the operation, in particular controlling, of a robot having a product gripper which is designed to represent at least one approach position of the product gripper for the picking up and/or placing down of a product, in particular of a food product, as a graphical element on a display device.

It is known to arrange such a robot in a cutting line having a slicer for the slicing of the food products and having a packing machine for the manufacture of ready-for-sale portioned packages disposed downstream of the slicer viewed in the conveying direction between these two machines. The food product is first sliced into product slices by the slicer, with in each case a plurality of product slices being combined to a portion of the food product. The portions are then transported by means of an incoming belt to the robot which approaches a pick-up position to pick up the portions from the incoming belt with the aid of the product gripper. The portions are subsequently each transferred to a target position on the packaging machine, with usually a plurality of target positions being preset in accordance with a configuration or format set. As a rule, an outgoing belt can furthermore also be approached to which portions are transferred which do not satisfy preset demands.

The aforesaid approach positions of the product gripper of the robot can be represented in each case as a graphical element on a display device to allow a setting of the coordinates of the respective approach position. For this purpose, the respective graphical element can be selected first and the coordinates for the respective approach position can subsequently be input via a numerical keypad. For this purpose, the respective operator must, however, be familiar with the coordinate system used by the robot.

BRIEF SUMMARY OF THE INVENTION

It is the underlying object of the invention to facilitate the setting of the coordinates of the respective approach position, in particular to provide a possibility which ensures that the setting of the coordinates of the respective approach position can also be carried out by an operator not specifically trained in handling the robot.

This object is satisfied by the features of claim 1 and in particular in that the apparatus is designed so that the respective graphical element can be displaced on the display device for the setting of the coordinates of the respective approach position, with the coordinates of the respective approach position being changed automatically in response to such a displacement of the graphical element in accordance with the displacement.

The apparatus in accordance with the invention—which in particular includes a control apparatus for the robot, a graphical user interface for the interaction of an operator with the apparatus and/or the display device—makes it possible that the respective graphical element is displaceable immediately, directly and/or manually. Such a displacement in particular takes place by virtue of a drag&drop function known per se, that is by dragging the respective graphical element over the display device.

Such a displacement has the effect that the coordinates of the respective approach position are automatically changed, and indeed in accordance with the displacement, i.e. a displacement of the display position of the graphical element on the display device automatically results in a corresponding displacement of the respective approach position of the product gripper of the robot. In this respect, the amount of the displacement of the approach position of the product gripper of the robot usually differs by a scaling factor with respect to the amount of the displacement of the display position.

The coordinates of the respective approach position can thus also be set or changed fast and simply by an operator not especially trained.

The set coordinates of the respective approach position are then in particular converted into control commands for the robot by the apparatus in accordance with the invention.

The setting or changing of the coordinates of the respective approach position is also called teaching the respective approach position.

Since it is generally possible that the product gripper can adopt any desired orientation or at least a plurality of mutually different orientations in a selected approach position, one or more rotational degrees of freedom can also be covered by the term "coordinates".

The display device is in particular a touch-sensitive display device, in particular a touch screen, with a displacement of the respective graphical element preferably taking place by touching with the finger of the user or with an input pen.

It is generally possible that the contact-sensitive display device is only touched for the selection of the respective graphical element and for the fixing of the end position of the display position of the graphical element for the direct displacement of the respective graphical element. Such a displacement of the respective graphical element preferably takes place, however, by virtue of a continuously contacting movement over the display device.

In accordance with an embodiment of the invention, the apparatus controls the robot such that the product gripper of the robot adopts the respective approach position after a selection of a respective graphical element for the setting of the coordinates of the respective approach position and before a displacement of the graphical element. The previously set approach position can hereby be displayed to the operator before a change of the approach position of the product gripper of the robot. This facilitates the change of the setting of the coordinates for the operator, particularly since the relative position of the desired, new approach position to be set with respect to the previous approach position can be illustrated.

The change in the setting of the coordinates can be further simplified in that the apparatus controls the robot so that the product gripper of the robot carries out a movement corresponding to the displacement during the displacement. The operator can therefore in particular track the direct effect of the displacement of the respective graphical element on the display device to the respective approach position without any time delay, that is in real time.

A plurality of approach positions for the placing down of products can preferably in each case be illustrated as a graphical element on the display device to take account of a configuration or format set, with the relative mutual arrangement of the plurality of graphical elements illustrated on the display device corresponding to a representation to scale of the relative mutual location of the plurality of approach positions.

The coordinates of a respective approach position can in particular additionally be set via a virtual arrow keyboard which can be shown on the display unit and/or via a numerical keypad for a fine adjustment of the respective approach position.

Further preferred embodiments of the apparatus in accordance with the invention result from the description of the Figures, from the drawing and from the dependent claims.

The invention furthermore relates to a robot having a product gripper and having an apparatus such as was described above.

The present invention furthermore relates to a method for the operation of a robot having a product gripper in which at least one approach position of the product gripper for the picking up and/or placing down of a product, in particular of a food product, is represented as a graphical element on a display device. The respective graphical element can be directly displaced on the display device for the setting of the coordinates of the respective approach position, with the coordinates of the respective approach position being changed automatically in response to such a displacement of the graphical element in accordance with the displacement.

Advantageous embodiments of the method in accordance with the invention result in an analog manner from the preferred embodiments of the apparatus in accordance with the invention.

A further subject of the invention is a computer program having programming code means to carry out the above-explained method when the program is carried out on a computer.

A subject of the present invention is additionally a computer program product having programming code means which are stored on a computer-readable data carrier to carry out the above-explained method when the computer program is carried out on a computer.

BRIEF DESCRIPTION OF THE DRAWINGS

A non-restricting embodiment of the invention is represented in the drawing and will be described in the following.

There are shown, schematically in each case.

DETAILED DESCRIPTION OF THE INVENTION

Figure 1:
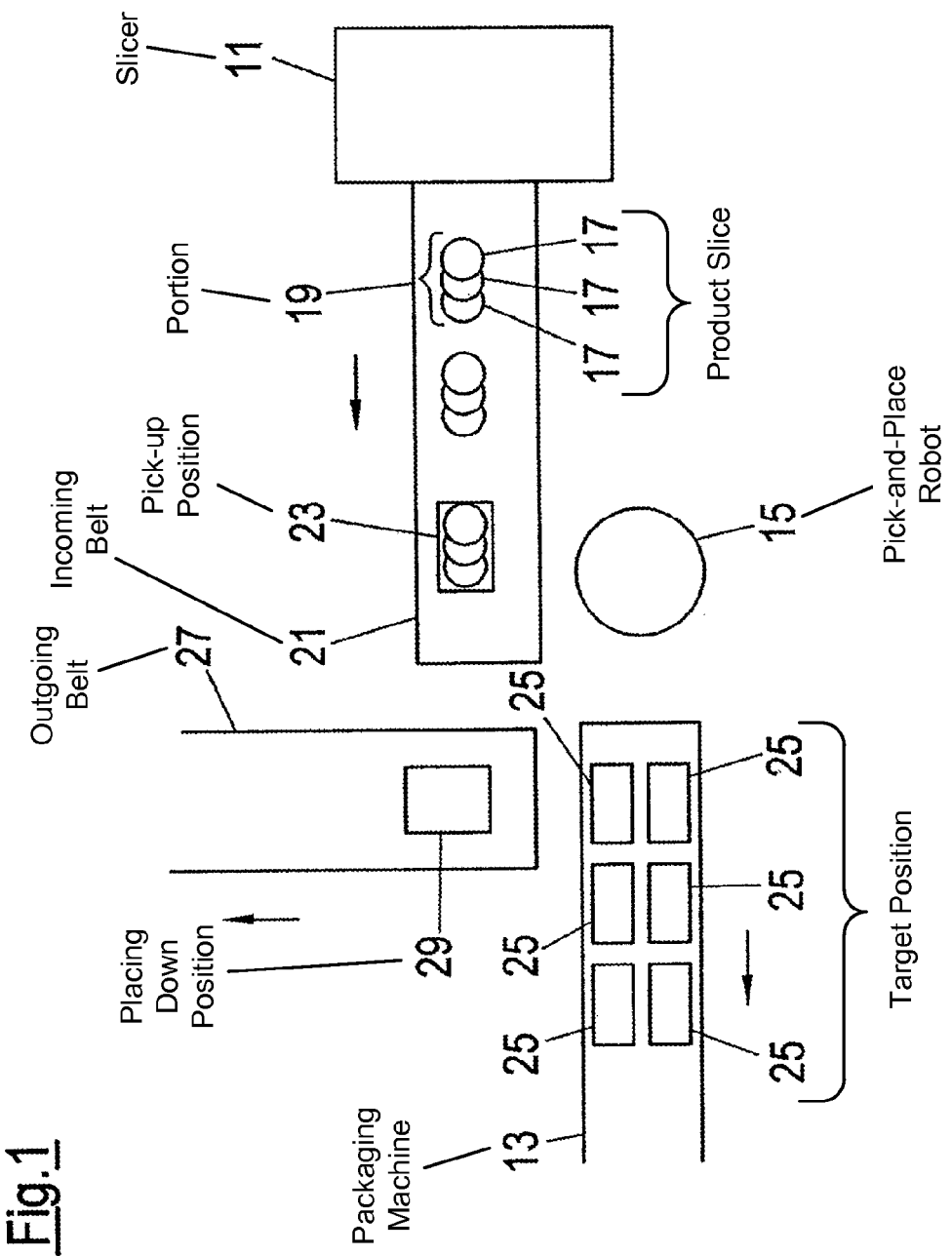
FIG. 1 a cutting line with a slicer for the slicing of food products with a pick-and-place robot and with a packaging machine.

The cutting line shown in FIG. 1 includes a slicer 11 for the slicing of sausage, cheese, ham and the like as well as a packaging machine 13 which is arranged downstream of the slicer 11 and of which only a conveyor belt is shown. A pick-and-place robot 15 is arranged between the slicer 11 and the packaging machine 13. The slicer 11 is provided to slice the respective food product into product slices 17, with in each case a plurality of product slices 17 being combined to form a portion 19.

An incoming belt 21 is provided for the transport of the portions 19 from the slicer 11 to the pick-and-place robot 15. The pick-and-place robot 15, which has a product gripper, is designed to pick up the portions 19 from the incoming belt 21 as soon as they have reached a pick-up position 23.

The picked up portions 19 are subsequently transferred to the packaging machine 13. Six target positions 25 are preset there which together define a configuration or format set and at which in each case a packaging tray is provided into which a respective portion 19 is placed, with the packaging trays still being connected to one another at this time and only being separated later. The number and location of the target positions 25 is only selected by way of example in FIG. 1. As soon as a portion 19 has been placed down at each of the target positions 25, the portions 19 placed down are transported on for further processing.

An outgoing belt 27 is furthermore provided to which those portions 19 are transferred by the pick-and-place robot 15 which do not satisfy preset demands, with such portions 19 being placed down at a placing-down position 29. Ham portions can be placed down here, for example, which have too high a fat content.

The pick-and-place robot 15 includes a program-controlled control apparatus which carries out a software component whose graphical user interface can be represented on a display device 31 designed as a touch screen via which the coordinates of the approach positions, namely of the pick-up position 23, of the target positions 25 and of the placing-down position 29 can be set.

The coordinates characterizing a respective approach position 23, 25, 29 can be given, for example, by the coordinates of the geometrical center of mass or of one of the corner points of the respective approach position 23, 25, 29 shown as a quadrangle.

Figure 2:
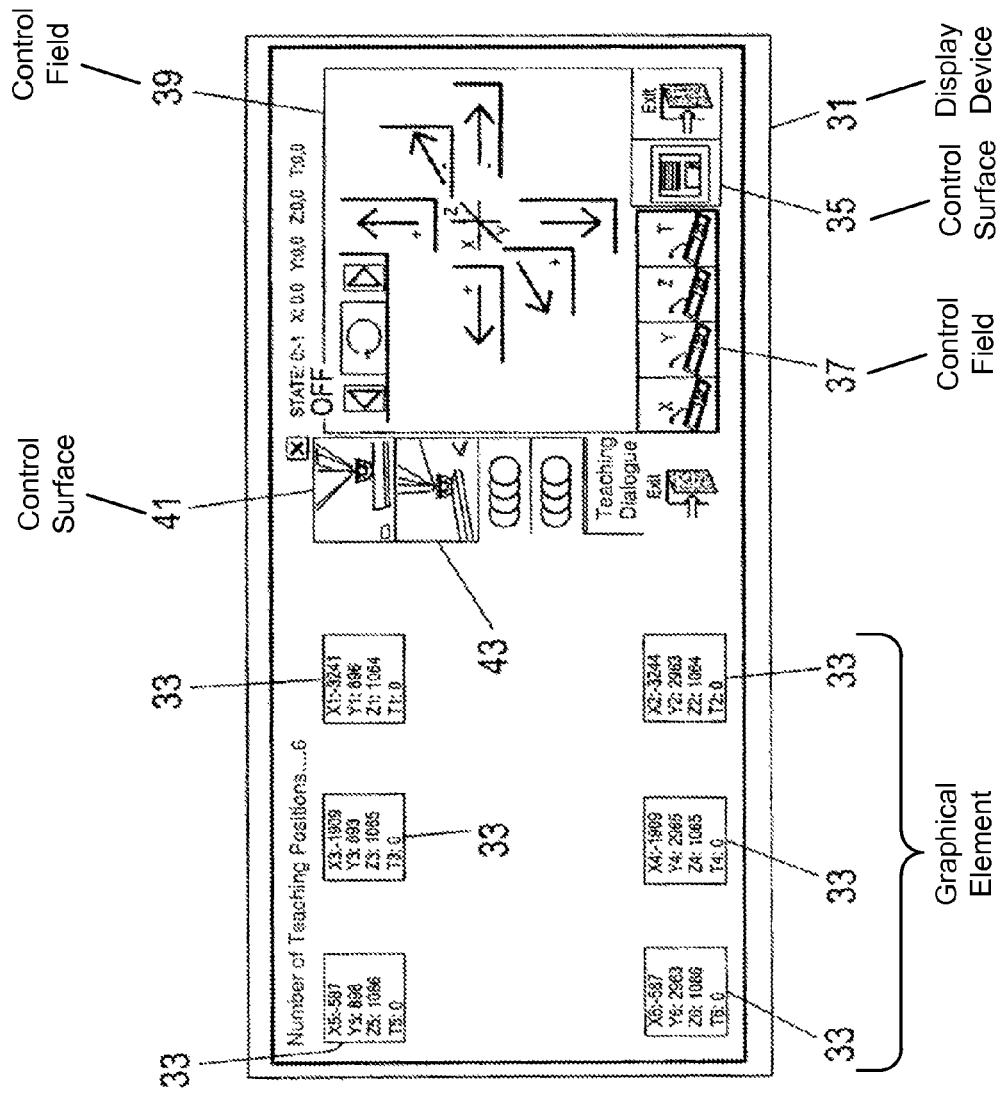
FIG. 2 a screenshot of the graphical screen content of the graphical user interface of a form designer implemented as a computer program for the setting of the coordinates of the approach position of the pick-and-place robot of FIG. 1.

The graphical image content shown in FIG. 2 includes six graphical elements 33 which each represent one of the target positions 25. The relative mutual arrangement of the graphical elements 33 represented on the display device 31 in this respect corresponds to a representation to scale of the relative mutual location of the target positions 25. The coordinates of the respective associated target position 25 are displayed in the graphical elements 33. The coordinates are the spatial coordinates X, Y, Z and an angle of rotation T about the Z axis.

The operator of the pick-and-place robot 15 can set the coordinates of the target position 25 in that the respective graphical element 33 is selected by touching and is subsequently dragged to the respective desired position. This position can be stored by touching the control area 35. The coordinates of the respective target position 25 are changed automatically in accordance with the displacement of the respective graphical element 33. If, for example, the graphical element 33 having the coordinates X1, Y1, Z1, T1 in FIG. 2 is dragged downwardly, the coordinate Y1 is automatically changed accordingly.

To facilitate the setting of the desired coordinates of the respective target position 25 for the operator, the product gripper of the pick-and-place robot 15 adopts the respective associated target position 25 after the selection of the respective graphical elements 33. On the dragging of the respective graphical element 33 over the display device 31, the product gripper of the pick-and-place robot 15 carries out a movement corresponding to the displacement on the display device 31. The operator can therefore directly monitor the effects of a changed carried out by him on the display device 31 at the target position 25 of the product gripper of the pick-and-place robot 15.

For the fine adjustment of the set target position 25, the operator can touch a control surface of the control panel 37, whereby a numerical keypad is opened via which the coordinates of the respective target position 25 can be directly input. A control field 39 having a virtual arrow keypad via which the setting of the respective target position 25 is likewise possible is furthermore also provided.

By touching the control surface 41 or 43, the pick-up position 23 or the placing-down position 29 can likewise be shown as a graphical element (not shown), with the coordinates of the pick-up position 23 or the placing-down position 29 being adjustable at least via the control fields 37 and 39, optionally also via a direct displacement of the respective graphical element such as was explained above with respect to the target positions 25.

The setting in accordance with the invention of the respective approach position by dragging the respective graphical element can also be carried out by an untrained operator.

The invention claimed is:

1. An apparatus for operation of a robot having a product gripper, the apparatus comprising a display device and a computer, the apparatus designed to represent at least one approach position of the product gripper for picking up and/or placing down of a product as a graphical element on the display device,
wherein the apparatus is designed to directly displace the graphical element on the display device for setting coordinates of the at least one approach position, with the coordinates of the at least one approach position being changed automatically in response to displacement of the graphical element, and
wherein the apparatus controls the robot such that the product gripper of the robot adopts the at least one approach position after selection of the graphical element and before displacement of the graphical element to change the coordinates of the at least one approach position.

2. An apparatus in accordance with claim 1, wherein the display device is designed as a contact-sensitive display device, in particular as a touch screen.

3. An apparatus in accordance with claim 2, wherein the displacement of the graphical element takes place by touching the graphical element with a finger of a user or with an input pen.

4. An apparatus in accordance with claim 2, wherein the displacement of the graphical element takes place by virtue of a continuously touching movement over the display device.

5. An apparatus in accordance with claim 1, wherein the apparatus controls the robot such that the product gripper of the robot carries out a movement corresponding to the displacement of the graphical element during the displacement of the graphical element.

6. An apparatus in accordance with claim 1, wherein a plurality of approach positions for the placing down of products is represented as a plurality of graphical elements.

7. An apparatus in accordance with claim 6, wherein a relative mutual arrangement of the plurality of graphical elements represented on the display device corresponds to a representation to scale of relative mutual locations of the plurality of approach positions.

8. An apparatus in accordance with claim 1, wherein the coordinates of the at least one approach position can additionally be set via a virtual arrow keypad which can be represented on the display device and/or via a numeric keypad.

9. An apparatus in accordance with claim 6, wherein the coordinates of the plurality of approach positions are displayed on the plurality of graphical elements.

10. An apparatus for operation of a robot and in combination with the robot, the apparatus comprising:
a display device;
the robot having a product gripper; and
a computer;
the apparatus designed to represent at least one approach position of the product gripper for picking up and/or placing down of a product as a graphical element on the display device,
wherein the apparatus is designed to directly displace the graphical element on the display device for setting coordinates of the at least one approach position, with the coordinates of the at least one approach position being changed automatically in response to displacement of the graphical element, and
wherein the apparatus controls the robot such that the product gripper of the robot adopts the at least one approach position after selection of the graphical element and before displacement of the graphical element to change the coordinates of the at least one approach position.

11. A method for the operating of a food-handling robot having a product gripper, comprising:
displaying a graphical element on a display device, wherein at least one approach position of the product gripper for the picking up and/or placing down of a product is represented as the graphical element on a display device, wherein the graphical element is directly displaced on the display device for setting coordinates of the at least one approach position, with the coordinates of the at least one approach position being changed automatically in response to displacement of the graphical element,
receiving inputs at the display device for selection and displacement of the graphical element; and
controlling the product gripper of the robot in accordance with the received selection and movement of the graphical element at the display device,
wherein the product gripper of the robot adopts the at least one approach position after receiving the input for selection of the graphical element and before receiving the input for displacement of the graphical element to change the coordinates of the at least one approach position.

12. A computer program product comprising:
programming code means which are stored on a non-transitory computer-readable data carrier and adapted to carry out the method of claim 11; and
a computer which executes the programming code means.

* * * * *